(12) United States Patent
Li et al.

(10) Patent No.: US 9,955,415 B2
(45) Date of Patent: Apr. 24, 2018

(54) RADIO LINK ESTABLISHMENT METHOD, APPARATUS, AND SYSTEM

(71) Applicant: HUAWEI TECHNOLOGIES CO., LTD., Shenzhen (CN)

(72) Inventors: Yue Li, Shenzhen (CN); Xiaolong Guo, Beijing (CN); Fei Yang, Shenzhen (CN); Song Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 14/700,241

(22) Filed: Apr. 30, 2015

(65) Prior Publication Data
US 2015/0237573 A1 Aug. 20, 2015

Related U.S. Application Data

(63) Continuation of application No. PCT/CN2012/083860, filed on Oct. 31, 2012.

(51) Int. Cl.
*H04W 4/00* (2009.01)
*H04W 48/20* (2009.01)
(Continued)

(52) U.S. Cl.
CPC ......... *H04W 48/20* (2013.01); *H04W 72/042* (2013.01); *H04W 72/0413* (2013.01); *H04W 76/046* (2013.01); *H04W 80/04* (2013.01)

(58) Field of Classification Search
None
See application file for complete search history.

(56) References Cited

U.S. PATENT DOCUMENTS 8,837,440 B2 * 9/2014 Feng ................. H04W 72/0413
370/336
2010/0227620 A1 9/2010 Naden et al.
(Continued)

FOREIGN PATENT DOCUMENTS

CN 101414947 4/2009
CN 102282905 12/2011
(Continued)

OTHER PUBLICATIONS

Extended European Search Report dated Aug. 31, 2015 in corresponding European Patent Application No. 12887421.1.
(Continued)

*Primary Examiner* — Anh-Vu Ly
(74) *Attorney, Agent, or Firm* — Staas & Halsey LLP

(57) ABSTRACT

Embodiments of the present invention relate to the communications field, and provide a radio link establishment method, apparatus, and system, which are used to save radio link overhead. The method includes: determining a first supporting user equipment UE; determining a first beneficial UE served by the first supporting UE; configuring synthesis layer information of the first supporting UE and first synthetic bearer information of the first supporting UE for the first supporting UE according to radio bearer information of the first beneficial UE; configuring synthesis layer information of the first beneficial UE for the first beneficial UE according to the radio bearer information of the first beneficial UE; and configuring synthesis layer information of the base station according to the radio bearer information of the first beneficial UE. The present invention is applicable to a scenario of communication between the UE and the base station.

30 Claims, 9 Drawing Sheets

(51) Int. Cl.
*H04W 72/04* (2009.01)
*H04W 76/04* (2009.01)
*H04W 80/04* (2009.01)

(56) References Cited

U.S. PATENT DOCUMENTS

| | | | |
|---|---|---|---|
| 2010/0260129 A1* | 10/2010 | Ulupinar | H04L 12/4633 370/329 |
| 2010/0309837 A1* | 12/2010 | Yi | H04B 7/155 370/315 |
| 2011/0103292 A1* | 5/2011 | Pasad | H04B 7/155 370/315 |
| 2012/0009931 A1 | 1/2012 | Ma et al. | |
| 2012/0015607 A1 | 1/2012 | Koskela et al. | |
| 2013/0065512 A1* | 3/2013 | Gunnarsson | H04B 7/155 455/7 |
| 2013/0322388 A1 | 12/2013 | Ahn et al. | |
| 2014/0038653 A1 | 2/2014 | Mildh et al. | |
| 2014/0112162 A1* | 4/2014 | Tavildar | H04W 48/08 370/252 |

FOREIGN PATENT DOCUMENTS

| | | |
|---|---|---|
| CN | 102469410 | 5/2012 |
| EP | 2 874 464 A1 | 5/2015 |
| JP | 2014-516498 | 7/2014 |
| WO | 2011/146653 A1 | 11/2011 |
| WO | 2012/091418 A2 | 7/2012 |
| WO | 2012/144941 A1 | 10/2012 |

OTHER PUBLICATIONS

PCT International Search Report dated Aug. 15, 2013 in corresponding International Patent Application No. PCT/CN2012/083860.

International Search Report dated Aug. 15, 2013 in corresponding International Patent Application No. PCT/CN2012/083860.

Japanese Notice of Allowance dated Apr. 8, 2016 in corresponding Japanese Patent Application No. 2015-538242.

\* cited by examiner

RADIO LINK ESTABLISHMENT METHOD, APPARATUS, AND SYSTEM

CROSS-REFERENCE TO RELATED APPLICATIONS

This application is a continuation of International Application No. PCT/CN2012/083860, filed on Oct. 31, 2012, which is hereby incorporated by reference in its entirety.

TECHNICAL FIELD

The present invention relates to the communications field, and in particular, to a radio link establishment method, apparatus, and system.

BACKGROUND

More and more terminals need to exchange small data with a network-side device. For example, when a smartphone runs certain applications such as a QQ application, the smartphone needs to exchange small data with the network-side device. For such applications, a communications system may perform corresponding operations in a one-by-one manner. Such a manner requires all terminals to execute a complete signaling procedure on every occasion of exchanging small data, and to send the data through scheduling. As far as the smartphone is concerned, the UE (User Equipment, user equipment) may get switched between an idle state and a connected state ceaselessly.

For a terminal that needs to transmit discontinuous small data, the following several processing manners are applicable: The first manner is that the terminal changes from the connected state to the idle state after completion of transmitting the data. If any data needs to be transmitted, the terminal changes from the idle state back to the connected state. The second manner is that the terminal keeps the connected state all along.

For the first manner, the terminal has to change from the idle state to the connected state on every occasion of transmitting data. Such a manner consumes too much signaling, and reduces transmission efficiency of the terminal. For the second manner, in order to keep the connected state of the terminal all along, plenty of physical layer resources, such as CQI (channel quality indication, channel quality indication), need to be consumed.

SUMMARY

Embodiments of the present invention provide a radio link establishment method, apparatus, and system, which are used to save radio link overhead.

To achieve such objectives, the embodiments of the present invention employ the following technical solutions:

According to a first aspect, an embodiment of the present invention provides a radio link establishment method, including: determining a first supporting user equipment UE; determining a first beneficial UE served by the first supporting UE; configuring synthesis layer information of the first supporting UE and first synthetic bearer information of the first supporting UE for the first supporting UE according to radio bearer information of the first beneficial UE, whereupon the first supporting UE establishes a first synthetic bearer according to the first synthetic bearer information of the first supporting UE and establishes a short-distance link to the first beneficial UE according to the synthesis layer information of the first supporting UE, so that the first supporting UE receives uplink data sent by the first beneficial UE over the short-distance link and sends the uplink data to a base station over the first synthetic bearer, or, receives downlink data sent by the base station over the first synthetic bearer and sends the downlink data to the first beneficial UE over the short-distance link; configuring synthesis layer information of the first beneficial UE for the first beneficial UE according to the radio bearer information of the first beneficial UE, whereupon the first beneficial UE establishes a short-distance link to the first supporting UE according to the synthesis layer information of the first beneficial UE, so that the first beneficial UE sends the uplink data to the first supporting UE over the short-distance link or receives downlink data sent by the first supporting UE over the short-distance link; and configuring synthesis layer information of the base station according to the radio bearer information of the first beneficial UE.

According to a second aspect, an embodiment of the present invention provides a radio link establishment method, including: receiving synthesis layer information of a first supporting user equipment UE and first synthetic bearer information of the first supporting UE that are sent by a base station, where the synthesis layer information of the first supporting UE includes a mapping relationship between a bearer identifier and a first synthetic bearer, where the mapping relationship is configured by the base station for the first supporting UE; and establishment a short-distance link to a first beneficial UE according to the synthesis layer information of the first supporting UE, and establishment a first synthetic bearer according to the first synthetic bearer information of the first supporting UE.

According to a third aspect, an embodiment of the present invention provides a radio link establishment method, including: receiving synthesis layer information of a first benefited user equipment UE that is sent by a base station, where the synthesis layer information of the first beneficial UE includes a mapping relationship between the bearer identifier and a radio bearer of the first beneficial UE, where the mapping relationship is configured by the base station for the first beneficial UE; and establishment a short-distance link to a first supporting UE according to the synthesis layer information of the first beneficial UE.

According to a fourth aspect, an embodiment of the present invention provides a base station, including: a determining unit, adapted to determine a first supporting user equipment UE, where the determining unit is further adapted to determine a first beneficial UE served by the first supporting UE; and a configuring unit, adapted to configure synthesis layer information of the first supporting UE and first synthetic bearer information of the first supporting UE for the first supporting UE according to radio bearer information of the first beneficial UE, whereupon the first supporting UE establishes a first synthetic bearer according to the first synthetic bearer information of the first supporting UE and establishes a short-distance link to the first beneficial UE according to the synthesis layer information of the first supporting UE, so that the first supporting UE receives uplink data sent by the first beneficial UE over the short-distance link and sends the uplink data to a base station over the first synthetic bearer, or, receives downlink data sent by the base station over the first synthetic bearer and sends the downlink data to the first beneficial UE over the short-distance link, where the configuring unit is further adapted to configure synthesis layer information of the first beneficial UE for the first beneficial UE according to the radio bearer information of the first beneficial UE, whereupon the first beneficial UE establishes a short-distance link to the first supporting UE according to the synthesis layer information of the first beneficial UE, so that the first beneficial UE sends the uplink data to the first supporting UE over the short-distance link or receives downlink data sent by the first supporting UE over the short-distance link, where the configuring unit is further adapted to configure synthesis layer information of the base station according to the radio bearer information of the first beneficial UE.

According to a fifth aspect, an embodiment of the present invention provides a supporting user equipment UE, including: a transceiver unit, adapted to receive synthesis layer information of a first supporting UE and first synthetic bearer information of the first supporting UE that are sent by a base station, where the synthesis layer information of the first supporting UE includes a mapping relationship between a bearer identifier and a first synthetic bearer, where the mapping relationship is configured by the base station for the first supporting UE; and a processing unit, adapted to establish a short-distance link to a first beneficial UE according to the synthesis layer information of the first supporting UE, and establish a first synthetic bearer according to the first synthetic bearer information of the first supporting UE.

According to a sixth aspect, an embodiment of the present invention provides a benefited user equipment UE, including: a transceiver unit, adapted to receive synthesis layer information of a first beneficial UE that is sent by a base station, where the synthesis layer information of the first beneficial UE includes a mapping relationship between the bearer identifier and a radio bearer of the first beneficial UE, where the mapping relationship is configured by the base station for the first beneficial UE; and a processing unit, adapted to establish a short-distance link to a first supporting UE according to the synthesis layer information of the first beneficial UE.

According to a seventh aspect, an embodiment of the present invention provides a radio link establishment system, including a base station, a benefited user equipment UE, and a supporting UE, where the base station is the foregoing base station, the beneficial UE is the foregoing beneficial UE, and the supporting UE is the foregoing supporting UE.

In the radio link establishment method, apparatus, and system provided in the embodiments of the present invention, the base station determines the first supporting UE, and determines the first beneficial UE of the first supporting UE, and then, according to the radio bearer of the first beneficial UE, configures the synthesis layer information of the first supporting UE and the first synthetic bearer information of the first supporting UE and configures the synthesis layer information of the first beneficial UE for the first beneficial UE. In this way, the first supporting UE can establish the first synthetic bearer according to the first synthetic bearer information of the first supporting UE. The first supporting UE establishes, according to the synthesis layer information of the first supporting UE, and the first beneficial UE establishes, according to the synthesis layer information of the first beneficial UE, a short-distance link between the first supporting UE and the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without establish efforts shall fall within the protection scope of the present invention.

Figure 1:
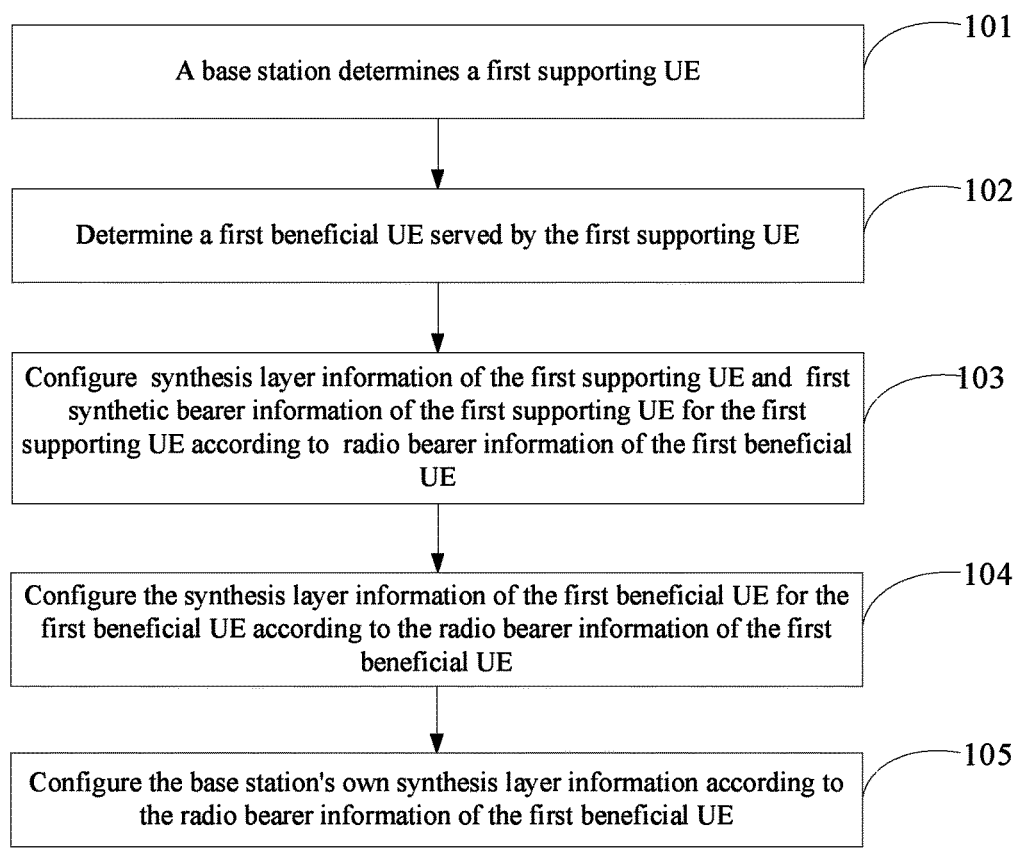
FIG. 1 is a schematic diagram of a radio link establishment method according to an embodiment of the present invention.

An embodiment of the present invention provides a radio link establishment method. As shown in FIG. 1, the method includes the following steps:

101. A base station determines a first supporting UE (User Equipment, user equipment).

Specifically, the base station selects the first supporting UE among UEs already in the connected state or UEs requesting to get into the connected state.

Optionally, the base station selects a UE of high channel quality and in the connected state as the first supporting UE.

Definitely, the support identifier of the first supporting UE may be preset, which is not limited in the present invention.

For example, the base station covers UE 1, UE 2, and UE 3, and all the three UEs are in the connected state. The base station selects UE 2 as the supporting UE among UE 1, UE 2, and UE 3 according to conditions such as channel quality and congestion state of the three UEs.

Optionally, the base station allocates a support identifier to the selected first supporting UE.

It should be noted that the support identifier of the first supporting UE may also be preset, which is not limited in the present invention.

102. Determine a first beneficial UE served by the first supporting UE.

It should be noted that the supporting UE is a UE that transmits data sent by other UE to the base station, and the beneficial UE is a UE that forwards the data to the base station through the supporting UE.

Specifically, after determining the first supporting UE, the base station determines the first beneficial UE served by the first supporting UE according to relationships between the first supporting UE and other UE. For example, the base station may determine the first beneficial UE of the first supporting UE according to location relationships between the first supporting UE and other UE that are in the connected state. Definitely, the base station may determine the first beneficial UE of the first supporting UE according to service relationships between the first supporting UE and other UE that are in the connected state.

It should be noted that the base station may determine the first beneficial UE of the first supporting UE according to other relationships, which is not limited in the present invention.

Further, when the base station receives an RRC establishment request message carrying at least one support identifier and sent by the first UE before determining the first beneficial UE served by the first supporting UE, if the at least one support identifier includes the support identifier of the first supporting UE, the base station determines the first UE as the first beneficial UE of the first supporting UE.

If the at least one support identifier does not include the support identifier of the first supporting UE, and, according to the relationship between the first UE and the first supporting UE, the base station detects that the first UE is more suitable for determining the first supporting UE as the supporting UE, then the base station determines the first UE as the first beneficial UE served by the first supporting UE.

For example, in a WiFi (Wireless Fidelity, wireless fidelity) AP (Access Point, radio access point) scenario, the first supporting UE is a WiFi-featured supporting UE, that is, the first supporting UE selected by the base station; and the first supporting UE runs WiFi. Before sending an RRC (Radio Resource Control, radio resource control) connection establishment request message, the first UE needs to search for surrounding WiFi signals to obtain at least one support identifier of the WiFi signals, add the obtained at least one support identifier of the WiFi signals into the RRC connection establishment request message, and send the message to the base station. After receiving the RRC connection establishment request message that carries the at least one support identifier of the WiFi signals, the base station determines the first UE as the first beneficial UE of the first supporting UE if it is detected that the at least one support identifier of the WiFi signals includes the support identifier of the first supporting UE. If it is detected that the at least one support identifier of the WiFi signals does not include the support identifier of the first supporting UE, the base station compares the first supporting UE with the supporting UE corresponding to the at least one support identifier to determine which one is more suitable as the supporting UE of the first UE. The base station determines the first UE as the first beneficial UE of the first supporting UE if the base station determines, according to a relationship such as a location relationship between the first UE and the first supporting UE, that the first UE is more suitable for determining the supporting UE as the first supporting UE.

It should be noted that in the embodiments of the present invention, when determining the beneficial UE served by the supporting UE, the base station can also determine a radio bearer of the beneficial UE at the same time.

103. Configure the synthesis layer information of the first supporting UE and the first synthetic bearer information of the first supporting UE for the first supporting UE according to the radio bearer information of the first beneficial UE.

Specifically, the base station configures synthesis layer information of the first supporting UE and first synthetic bearer information of the first supporting UE for the first supporting UE according to radio bearer information of the first beneficial UE, whereupon the first supporting UE establishes a first synthetic bearer according to the first synthetic bearer information of the first supporting UE and establishes a short-distance link to the first beneficial UE according to the synthesis layer information of the first supporting UE, so that the first supporting UE receives uplink data sent by the first beneficial UE over the short-distance link and sends the uplink data to a base station over the first synthetic bearer, or, receives downlink data sent by the base station over the first synthetic bearer and sends the downlink data to the first beneficial UE over the short-distance link.

The synthesis layer information of the first supporting UE includes a mapping relationship between a bearer identifier and a first synthetic bearer, where the mapping relationship is configured by the base station for the first supporting UE.

The first synthetic bearer information is information about a radio bearer that needs to be establishd by the first supporting UE, where the radio bearer is the same as the radio bearer of the first beneficial UE.

Optionally, the bearer identifier includes a short-distance bearer.

The bearer identifier is configured by the base station, and marks the one-to-one mapping relationship between the radio bearer of the beneficial UE and the synthetic bearer of the supporting UE.

It should be noted that the first synthetic bearer is establishd by the first supporting UE, and is a radio bearer for transmitting the data of the first beneficial UE.

Specifically, because the first supporting UE needs to transmit the data of the first beneficial UE, a radio bearer identical to the radio bearer of the first beneficial UE, that is, the first synthetic bearer, needs to be establishd on the first supporting UE side. In this case, the base station needs to notify the radio bearer information of the first beneficial UE to the first supporting UE, and therefore, the base station configures the first synthetic bearer information of the first supporting UE according to the radio bearer information of the first beneficial UE. Further, the base station needs to establish a one-to-one mapping relationship between the radio bearer of the first beneficial UE and the first synthetic bearer of the first supporting UE. In this case, the base station needs to configure the first supporting UE by using the mapping relationship between the bearer identifier and the first synthetic bearer of the first supporting UE as the synthesis layer information of the first supporting UE, where the first synthetic bearer corresponds to the radio bearer of the first beneficial UE.

For example, the radio bearer 1 of the first beneficial UE is in a one-to-one mapping relationship with the first synthetic bearer 3 of the first supporting UE. In this case, the base station configures the first supporting UE by using the mapping relationship between the bearer identifier 1 and the first synthetic bearer 3 of the first supporting UE as the synthesis layer information of the first supporting UE.

Further, the base station adds the synthesis layer information of the first supporting UE and the first synthetic bearer information of the first supporting UE into an RRC reconfiguration message, and, when configuring the synthesis layer information of the first supporting UE and the first synthetic bearer information of the first supporting UE for the first supporting UE, configures the first supporting UE by using the RRC reconfiguration message.

104. Configure the synthesis layer information of the first beneficial UE for the first beneficial UE according to the radio bearer information of the first beneficial UE.

Specifically, the base station configures the synthesis layer information of the first beneficial UE for the first beneficial UE according to the radio bearer information of the first beneficial UE, whereupon the first beneficial UE establishes a short-distance link to the first supporting UE according to the synthesis layer information of the first beneficial UE, so that the first beneficial UE sends the uplink data to the first supporting UE over the short-distance link or receives downlink data sent by the first supporting UE over the short-distance link.

The synthesis layer information of the first beneficial UE includes a mapping relationship between the bearer identifier and a radio bearer of the first beneficial UE, where the mapping relationship is configured by the base station for the first beneficial UE.

Specifically, the first beneficial UE communicates with the base station through the first supporting UE, and the base station needs to establish a mapping relationship between the radio bearer of the first beneficial UE and the bearer identifier, and a mapping relationship between the first synthetic bearer of the first supporting UE and the bearer identifier.

The base station configures the first beneficial UE by using the mapping relationship between the radio bearer of the first beneficial UE and the bearer identifier as the synthesis layer information of the first beneficial UE. Step 103 has described how the base station establishes a mapping relationship between the first synthetic bearer of the first supporting UE and the bearer identifier, which is not repeated here any further.

As mentioned above, the base station configures the first beneficial UE by using the mapping relationship between the radio bearer 1 of the first beneficial UE and the bearer identifier 1 as the synthesis layer information of the first beneficial UE. In this way, after the base station configures the synthesis layer information for the first beneficial UE and the first supporting UE, the radio bearer 1 of the first beneficial UE corresponds to the bearer identifier 1, and the bearer identifier 1 corresponds to the first synthetic bearer 3 of the first supporting UE, and therefore, the radio bearer 1 of the first beneficial UE is in a one-to-one mapping relationship with the first synthetic bearer 3 of the first supporting UE.

Further, the base station adds the synthesis layer information of the first beneficial UE into an RRC reconfiguration message, and, when configuring the synthesis layer information of the first beneficial UE for the first beneficial UE, configures the first beneficial UE by using the RRC reconfiguration message.

105. Configure synthesis layer information of the base station according to the radio bearer information of the first beneficial UE.

Synthesis layer information of the base station includes a mapping relationship between the first synthetic bearer identified by the bearer identifier and the radio bearer. In this way, after receiving the data, according to the bearer identifier in the data, the base station can know the beneficial UE that sends the data, and know the specific radio bearer used by the beneficial UE to send the data.

Specifically, when configuring the synthesis layer information for the first supporting UE and the first beneficial UE, the base station needs to configure the mapping relationship between the first synthetic bearer of the first supporting UE and the bearer identifier, and the mapping relationship between the radio bearer of the first beneficial UE and the bearer identifier, as synthesis layer information of the base station.

As described in the foregoing, after configuring the synthesis layer information for the first beneficial UE and the first supporting UE, the base station needs to configure synthesis layer information for itself, in which the radio bearer 1 of the first beneficial UE corresponds to the bearer identifier 1 and the first synthetic bearer 3 of the first supporting UE corresponds to the bearer identifier 1. In this way, after receiving the data, according to the bearer identifier 1 in the data, the base station can know that the first beneficial UE sends the data through the radio bearer 1, and can send downlink data to the first beneficial UE through the first supporting UE.

It should be noted that the present invention does not limit the order between steps 103, 104, and 105; and steps 103, 104, and 105 may be implemented consecutively, or steps 104, 103, and 105 may be implemented consecutively, or steps 103, 104 and 105 may be implemented simultaneously, which is not limited in the present invention. Only one of them is shown in the figures.

In the radio link establishment method provided in the embodiment of the present invention, the base station determines the first supporting UE, and determines the first beneficial UE of the first supporting UE, and then, according to the radio bearer of the first beneficial UE, configures the synthesis layer information of the first supporting UE and the first synthetic bearer information of the first supporting UE and configures the synthesis layer information of the first beneficial UE for the first beneficial UE. In this way, the first supporting UE can establish the first synthetic bearer according to the first synthetic bearer information of the first supporting UE. The first supporting UE establishes, according to the synthesis layer information of the first supporting UE, and the first beneficial UE establishes, according to the synthesis layer information of the first beneficial UE, a short-distance link between the first supporting UE and the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency.

Figure 2:
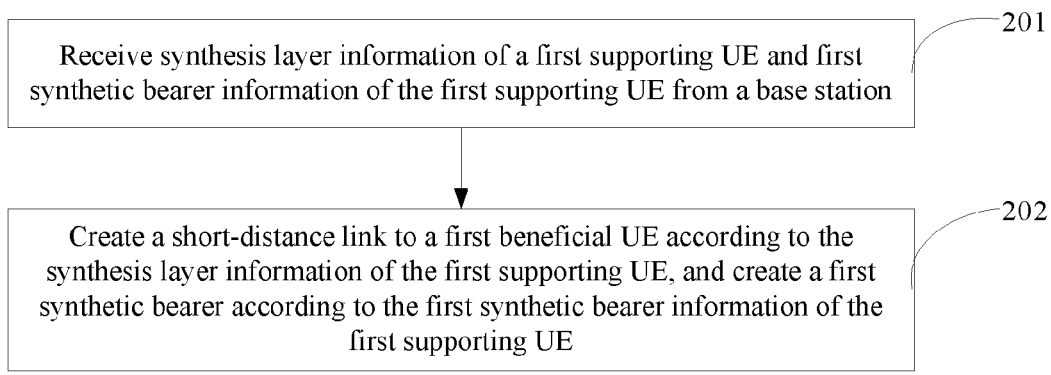
FIG. 2 is a schematic diagram of another radio link establishment method according to an embodiment of the present invention.

An embodiment of the present invention provides a radio link establishment method. As shown in FIG. 2, the method includes the following steps:

201. Receive synthesis layer information of a first supporting user equipment UE and first synthetic bearer information of the first supporting UE that are sent by a base station.

The synthesis layer information of the first supporting UE includes a mapping relationship between a bearer identifier and a first synthetic bearer, where the mapping relationship is configured by the base station for the first supporting UE.

The first synthetic bearer information is information about a radio bearer that needs to be establishd by the first supporting UE, where the radio bearer is the same as the radio bearer of the first beneficial UE.

Optionally, the bearer identifier includes a short-distance bearer.

The bearer identifier is configured by the base station, and marks the one-to-one mapping relationship between the radio bearer of the beneficial UE and the synthetic bearer of the supporting UE.

It should be noted that the first synthetic bearer is establishd by the first supporting UE, and is a radio bearer for transmitting the data of the first beneficial UE.

Optionally, the base station adds the synthesis layer information of the first supporting UE and the first synthetic bearer information of the first supporting UE into a radio resource control RRC reconfiguration message, and sends the message to the first supporting UE. The first supporting UE receives the RRC reconfiguration message.

Further, the RRC reconfiguration message further carries a support identifier configured by the base station for the first supporting UE. After receiving the support identifier, the first supporting UE may broadcast the support identifier in a broadcast manner so that the first UE knows its support identifier.

202. Establish a short-distance link to a first beneficial UE according to the synthesis layer information of the first supporting UE, and establish a first synthetic bearer according to the first synthetic bearer information of the first supporting UE.

Specifically, according to the synthesis layer information of the first supporting UE, the first supporting UE may send a short-distance link establishment request to the first beneficial UE. Therefore, the first beneficial UE receives the short-distance link establishment request, responds to the short-distance link establishment request, and establishes a short-distance link between the first supporting UE and the first beneficial UE for the purpose of communication between the first supporting UE and the first beneficial UE. Alternatively, the first beneficial UE may send a short-distance link establishment request to the first supporting UE, and therefore, the first supporting UE receives the short-distance link establishment request, responds to the short-distance link establishment request, and establishes a short-distance link between the first supporting UE and the first beneficial UE.

It should be noted that only one short-distance link is establishd between one first supporting UE and one first beneficial UE.

It should be noted that the short-distance link between the first supporting UE and the first beneficial UE may also be establishd in other manners, which is not limited in the present invention.

Because the first supporting UE needs to transmit the data of the first beneficial UE, a radio bearer identical to the radio bearer of the first beneficial UE, that is, the first synthetic bearer, needs to be establishd on the first supporting UE side. In this case, the first supporting UE establishes the first synthetic bearer according to the first synthetic bearer information of the first supporting UE.

The first synthetic bearer is establishd by the first supporting UE, and is a radio bearer for transmitting the data of the first beneficial UE.

In the radio link establishment method provided in the embodiment of the present invention, after receiving the synthesis layer information of the first supporting UE and the first synthetic bearer information of the first supporting UE that are sent by the base station, the base station establishes a short-distance link to the first beneficial UE according to the synthesis layer information of the first supporting UE, and establishes a first synthetic bearer according to the first synthetic bearer information of the first supporting UE, so that the data information of the first beneficial UE is forwarded. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency.

Figure 3:
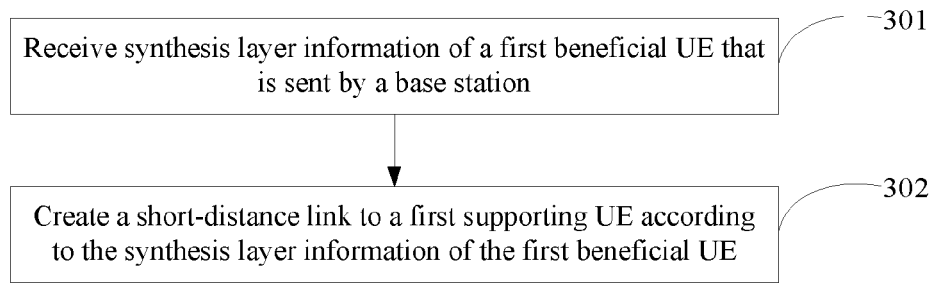
FIG. 3 is a schematic diagram of another radio link establishment method according to an embodiment of the present invention.

An embodiment of the present invention provides a radio link establishment method. As shown in FIG. 3, the method includes the following steps:

301. Receive synthesis layer information of a first benefited user equipment UE that is sent by a base station.

The synthesis layer information of the first beneficial UE includes a mapping relationship between the bearer identifier and a radio bearer of the first beneficial UE, where the mapping relationship is configured by the base station for the first beneficial UE.

Optionally, the bearer identifier includes a short-distance bearer.

The bearer identifier is configured by the base station, and marks the one-to-one mapping relationship between the radio bearer of the beneficial UE and the synthetic bearer of the supporting UE.

302. Establish a short-distance link to a first supporting UE according to the synthesis layer information of the first beneficial UE.

Specifically, if the first supporting UE sends a short-distance link establishment request, the first beneficial UE responds to the short-distance link establishment request, and establishes a short-distance link to the first supporting UE, whereupon the first beneficial UE sends the data destined for the base station to the first supporting UE over the short-distance link, so that the first supporting UE forwards the data to the base station; or, when the base station needs to send data to the first beneficial UE, the base station sends the data to the first supporting UE, and the first supporting UE sends the data to the first beneficial UE over the short-distance link. The first beneficial UE may send a short-distance link establishment request to the first supporting UE, and therefore, the first supporting UE receives the short-distance link establishment request, responds to the short-distance link establishment request, and establishes a short-distance link.

Further, after the first beneficial UE establishes the short-distance link to the first supporting UE, the base station controls the first beneficial UE to get into the out-of-sync connection state. In this case, when needing to send data, the first beneficial UE sends the data to the base station through the first supporting UE. When needing to receive data sent by the base station, the first beneficial UE receives the data through the first supporting UE.

In the radio link establishment method provided in the embodiment of the present invention, the first beneficial UE receives the synthesis layer information of the first beneficial UE that is sent by the base station, and establishes a short-distance link to the first supporting UE according to the synthesis layer information of the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency.

Figure 4:
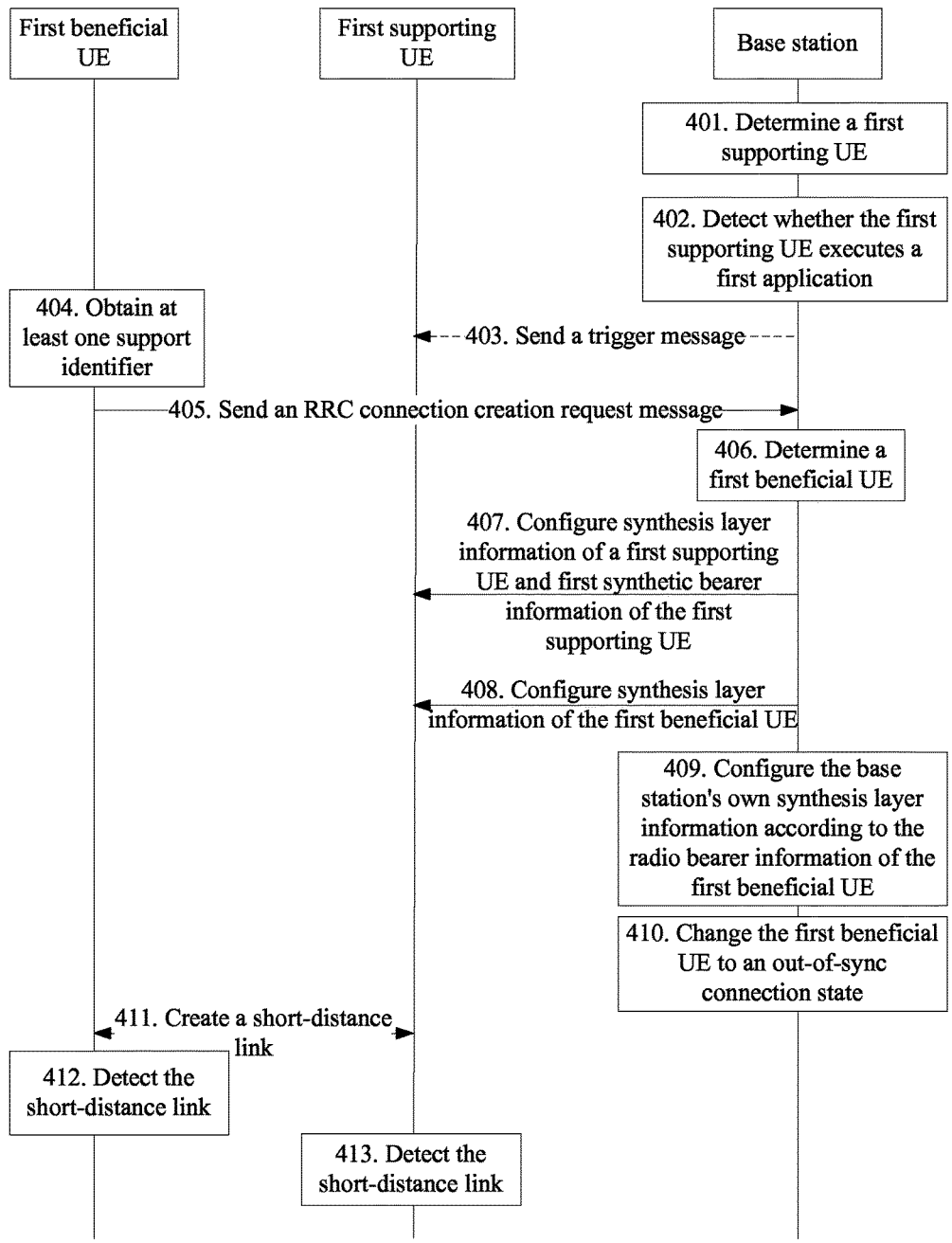
FIG. 4 is a schematic diagram of another radio link establishment method according to an embodiment of the present invention.

An embodiment of the present invention provides a radio link establishment method. As shown in FIG. 4, the method includes the following steps:

401. This step is the same as step 101, and is not repeated here any further.

402. The base station detects whether the first supporting UE executes a first application.

The first application is an application run by the supporting UE.

Specifically, after determining the first supporting UE, the base station detects the first supporting UE, and checks whether the first supporting UE has executed the first application. If the first supporting UE has executed the first application, step 404 is performed; and, if the first supporting UE does not execute the first application, step 403 is performed.

403. The base station sends a trigger message to the first supporting UE, and the first supporting UE receives and executes the trigger message.

The trigger message is a message for instructing the supporting UE selected by the base station to execute a first application.

Specifically, the first supporting UE receives the trigger message, and executes the first application according to the trigger message.

For example, in a WiFi AP scenario, the base station determines the UE as the first supporting UE, and therefore, the first supporting UE at this time is a WiFi-featured supporting UE. If the first supporting UE does not run the WiFi application, the base station sends a trigger message to the first supporting UE, and the first supporting UE runs the WiFi application after receiving the trigger message.

It should be noted that the trigger message may be a radio resource control protocol RRC message, or MAC (Media Access Control, Media Access Control) layer message, or physical layer message, or other messages, which is not limited in the present invention.

404. A first UE obtains at least one support identifier.

Specifically, the first UE obtains at least one support identifier that is broadcast by the supporting UE which has run the first application.

405. The first UE sends an RRC connection establishment request message to the base station. The base station receives the RRC connection establishment request message sent by the first UE.

The RRC connection establishment request message carries at least one support identifier of the supporting UE.

406. The base station determines a first beneficial UE served by the first supporting UE.

Specifically, reference may be made to step 102, and no repeated description is given here any further.

407. The base station configures the synthesis layer information of the first supporting UE and the first synthetic bearer information of the first supporting UE for the first supporting UE according to the radio bearer information of the first beneficial UE, and the first supporting UE receives the synthesis layer information of the first supporting UE and the first synthetic bearer information of the first supporting UE.

Specifically, reference may be made to step 103 and step 201, and no repeated description is given here any further.

408. The base station configures the synthesis layer information of the first beneficial UE for the first beneficial UE according to the radio bearer information of the first beneficial UE, and the first beneficial UE receives the synthesis layer information of the first beneficial UE.

Specifically, reference may be made to step 104 and step 301, and no repeated description is given here any further.

409. This step is the same as step 105, and is not repeated here any further.

It should be noted that the order between steps 407, 408, and 409 is adjustable as required. The base station may perform steps 407, 408, and 409 consecutively, or perform steps 408, 407, and 409 consecutively, or perform steps 407, 408, and 409 simultaneously, which is not limited in the present invention.

410. The base station changes the first beneficial UE to an out-of-sync connection state.

Specifically, after sending the synthesis layer information of the first beneficial UE to the first beneficial UE, the base station sends no TA (Time Alignment, time alignment) information to the first beneficial UE within a preset time, so as to change the first beneficial UE into the out-of-sync connection state.

It should be noted that the TA information is an advance amount for adjusting uplink sending of the UE so that uplink arrivals of all UEs on the base station side are aligned.

It should be noted that the preset time may be preset by the base station as required.

It should be noted that the base station may also change the first beneficial UE into the out-of-sync connection state in other ways, which is not limited in the embodiment of the present invention.

411. The first supporting UE establishes a short-distance link to the first beneficial UE.

Specifically, reference may be made to step 202 and step 302, and no repeated description is given here any further.

412. The first beneficial UE detects the short-distance link.

The synthesis layer information of the first beneficial UE further includes information instructing the first beneficial UE to detect the short-distance link of the first beneficial UE.

Specifically, after the short-distance link is establishd between the first beneficial UE and the first supporting UE, the first beneficial UE detects the short-distance link, and therefore, when the first beneficial UE fails in sending the uplink data, the first beneficial UE changes into a synchronous connection state, and then sends a short-distance link report to the base station. In this case, the short-distance link quality report records that the quality index of the short-distance link is lower than a second preset value.

It should be noted that the second preset value is preset by the base station and the first beneficial UE.

413. The first supporting UE detects the short-distance link.

The synthesis layer information of the first supporting UE further includes information instructing the first supporting UE to detect the short-distance link of the first supporting UE.

Specifically, after the short-distance link is establishd between the first beneficial UE and the first supporting UE, the first supporting UE detects the short-distance link, and therefore, when the first supporting UE fails in sending the downlink data to the first beneficial UE, the first supporting UE reports the failure to the base station. In this case, the short-distance link quality report records that the quality index of the short-distance link is lower than a third preset value, and therefore, when receiving the short-distance link quality report, the base station detects that the quality index of the short-distance link is lower than the third preset value and may trigger change of the first beneficial UE from the out-of-sync connection state to the synchronized connection or initiate a procedure of changing the first supporting UE.

It should be noted that the third preset value is preset by the base station and the first supporting UE.

Figure 5:
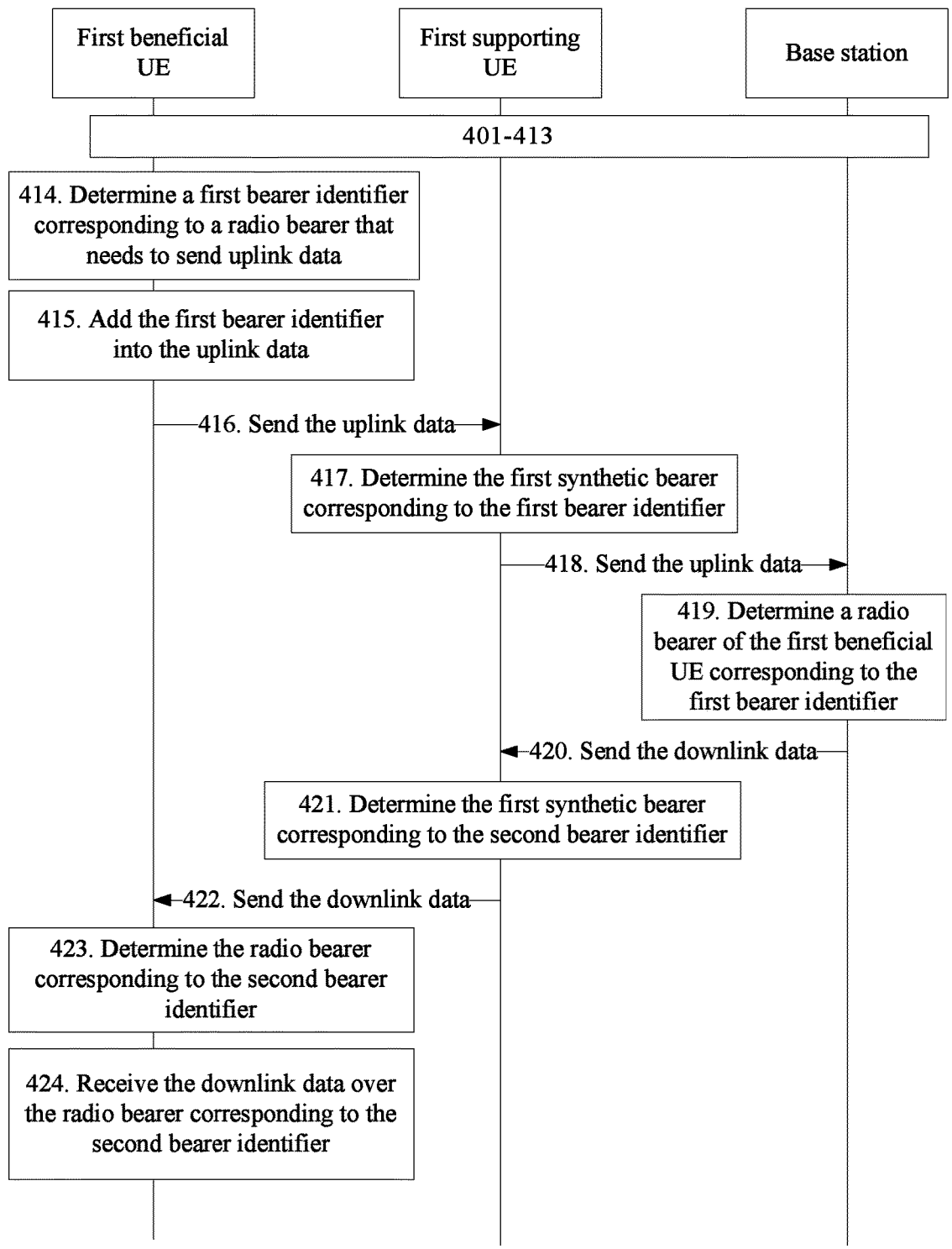
FIG. 5 is a schematic diagram of another radio link establishment method according to an embodiment of the present invention.

It should be noted that, if the first beneficial UE needs to send uplink data to the base station, steps 414 to 419 are performed, as shown in FIG. 5. If the base station needs to send downlink data to the first beneficial UE, steps 420 to 424 are performed, as shown in FIG. 5.

414. If the first beneficial UE needs to send uplink data to the base station, according to the synthesis layer information of the first beneficial UE, determine a first bearer identifier corresponding to a radio bearer that needs to send uplink data.

Specifically, when the first beneficial UE needs to send uplink data to the base station, the radio bearer corresponding to the uplink data is determined first, that is, the first radio bearer is determined; and then, according to the synthesis layer information of the first beneficial UE, the bearer identifier corresponding to the radio bearer that needs to send uplink data is determined, that is, the first bearer identifier corresponding to the first radio bearer is determined. In addition, after determining the radio bearer that needs to send uplink data, the first beneficial UE determines the corresponding short-distance link according to the radio bearer that needs to send uplink data.

It should be noted that in the beneficial UE, one radio bearer corresponds to only one short-distance link. For example, the first radio bearer only corresponds to a short-distance link between the first beneficial UE and the first supporting UE, and no longer corresponds to a short-distance link between the first beneficial UE and another supporting UE. One short-distance link may correspond to multiple radio bearers of the first beneficial UE.

415. The first beneficial UE adds the first bearer identifier into the uplink data.

416. The first beneficial UE sends the uplink data to the first supporting UE over the radio bearer that needs to send the uplink data and a short-distance link corresponding to the radio bearer that needs to send the uplink data. The first supporting UE receives the uplink data sent by the first beneficial UE over the short-distance link.

The uplink data carries a first bearer identifier.

417. The first supporting UE determines a first synthetic bearer corresponding to the first bearer identifier according to the first bearer identifier in the uplink data and the synthesis layer information of the first supporting UE.

The first synthetic bearer corresponding to the first bearer identifier is a synthetic bearer used for sending the uplink data.

Specifically, after receiving the uplink data, the first supporting UE parses the uplink data to obtain the first bearer identifier, searches for the synthesis layer information of the first supporting UE according to the first bearer identifier, and therefore finds the first synthetic bearer corresponding to the first bearer identifier.

418. The first supporting UE sends the uplink data to the base station over the first synthetic bearer corresponding to the first bearer identifier. The base station receives the uplink data sent by the first supporting UE.

The uplink data carries a first bearer identifier.

419. According to the first bearer identifier in the uplink data and synthesis layer information of the base station, the base station determines a radio bearer of the first beneficial UE that sends the uplink data, where the radio bearer corresponds to the first bearer identifier.

Specifically, after receiving the uplink data, the base station parses the uplink data to obtain the first bearer identifier, and, according to the first bearer identifier, searches for synthesis layer information of the base station, finds the radio bearer of the first beneficial UE and processes the uplink data, where the radio bearer corresponds to the first bearer identifier recorded in synthesis layer information of the base station.

420. The base station sends downlink data to the first supporting UE. The first supporting UE receives the downlink data sent by the base station.

The downlink data carries a second bearer identifier, and therefore, the first supporting UE determines a first synthetic bearer corresponding to the second bearer identifier according to the second bearer identifier and uses the first synthetic bearer corresponding to the second bearer identifier to receive the downlink data, so that the first supporting UE sends the downlink data to a corresponding first beneficial UE over a short-distance link corresponding to the first synthetic bearer corresponding to the second bearer identifier.

Specifically, if the base station needs to send the downlink data to the second radio bearer of the first beneficial UE, the base station searches for synthesis layer information of the base station, and therefore determines the bearer identifier corresponding to the second radio bearer of the first beneficial UE, that is, determines the second bearer identifier. The base station adds the second bearer identifier into the downlink data, and sends the downlink data to the first supporting UE.

421. The first supporting UE determines a first synthetic bearer corresponding to the second bearer identifier according to the second bearer identifier and the synthesis layer information of the first supporting UE.

Specifically, after receiving the downlink data, the first supporting UE parses the downlink data to obtain the second bearer identifier, searches for the synthesis layer information of the first supporting UE according to the second bearer identifier, and therefore determines the first synthetic bearer corresponding to the second bearer identifier.

422. The first supporting UE sends the downlink data to a corresponding first beneficial UE over the first synthetic bearer corresponding to the second bearer identifier and a short-distance link corresponding to the first synthetic bearer corresponding to the second bearer identifier. The first beneficial UE receives the downlink data sent by the first supporting UE over the short-distance link.

Specifically, after determining the first synthetic bearer corresponding to the second bearer identifier, the first supporting UE receives the downlink data over the first synthetic bearer corresponding to the second bearer identifier, and can determine a short-distance link corresponding to the first synthetic bearer corresponding to the second bearer identifier according to the first synthetic bearer corresponding to the second bearer identifier. The downlink data is sent to the corresponding short-distance link over the first synthetic bearer corresponding to the second bearer identifier, and then sent to the first beneficial UE corresponding to the short-distance link.

It should be noted that in the first supporting UE, one synthetic bearer corresponds to only one short-distance link.

One short-distance link may correspond to multiple synthetic bearers of the first supporting UE.

423. The first beneficial UE determines the radio bearer corresponding to the second bearer identifier according to the second bearer identifier carried in the downlink data and the synthesis layer information of the first beneficial UE.

Specifically, after receiving the downlink data, the first beneficial UE parses the downlink data to obtain the second bearer identifier, searches for the synthesis layer information of the first beneficial UE according to the second bearer identifier, and therefore determines the radio bearer corresponding to the second bearer identifier, that is, determines the second radio bearer.

424. The first beneficial UE receives the downlink data over the radio bearer corresponding to the second bearer identifier.

Specifically, after determining the second radio bearer, the first beneficial UE receives the downlink data over the determined second radio bearer, and sends the downlink data to the corresponding processing unit. The first beneficial UE processes the downlink data.

It should be noted that, when the first beneficial UE detects that the link quality index of the short-distance link is lower than a second preset value or the first supporting UE detects that the link quality index of the short-distance link is lower than a third preset value, a report message is sent to the base station. After receiving the report message, the base station may perform an operation of changing the first beneficial UE from the out-of-sync connection state to the synchronous connection state, or perform an operation of changing the first supporting UE.

Figure 6:
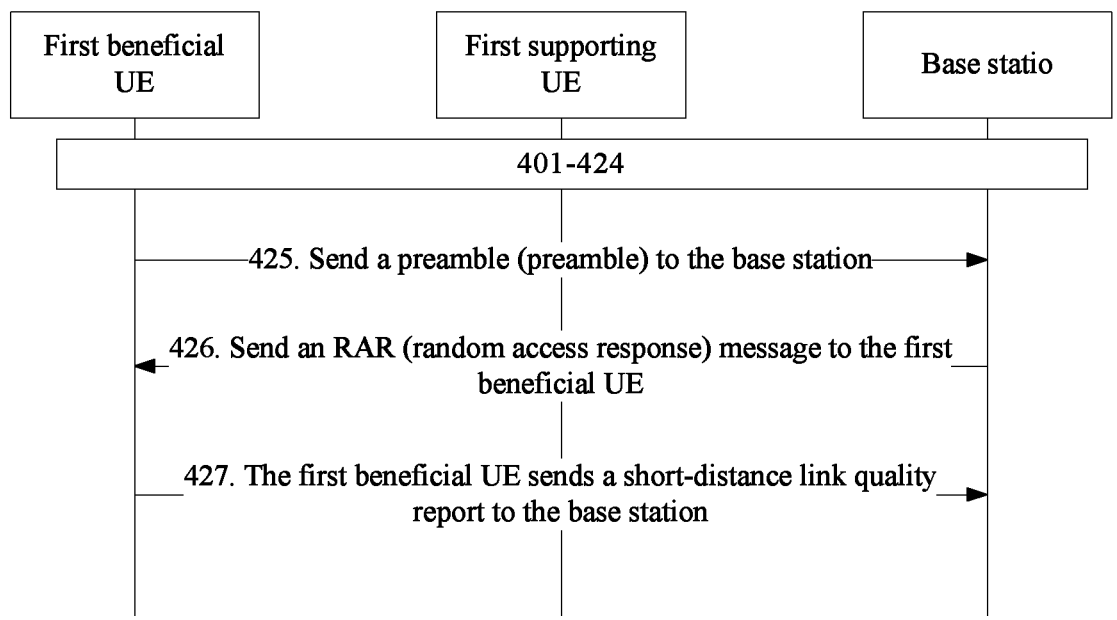
FIG. 6 is a schematic diagram of another radio link establishment method according to an embodiment of the present invention.

It should be noted that, as regards how the first beneficial UE initiates an operation of changing from an out-of-sync connection state to a synchronous connection state and sends a short-distance link quality report to the base station after detecting that the quality index of the short-distance link is lower than the second preset value, reference may be made to steps 425, 426, and 427, as shown in FIG. 6.

425. The first beneficial UE sends a preamble (preamble) to the base station if it is detected that the quality index of the short-distance link is lower than the second preset value. The base station receives the preamble.

426. The base station sends a RAR (Random Access Response, random access response) message to the first beneficial UE to change the first beneficial UE from the out-of-sync connection state to the synchronous connection state. The first beneficial UE receives the RAR message sent by the base station.

427. The first beneficial UE sends a short-distance link quality report to the base station.

The short-distance link quality report records the quality of the short-distance link.

Optionally, the first beneficial UE may add the short-distance link quality report into a message 3 and sends the message to the base station.

It should be noted that the first beneficial UE may also add the short-distance link quality report into another message and sends the message to the base station, which is not limited in the present invention.

Figure 7:
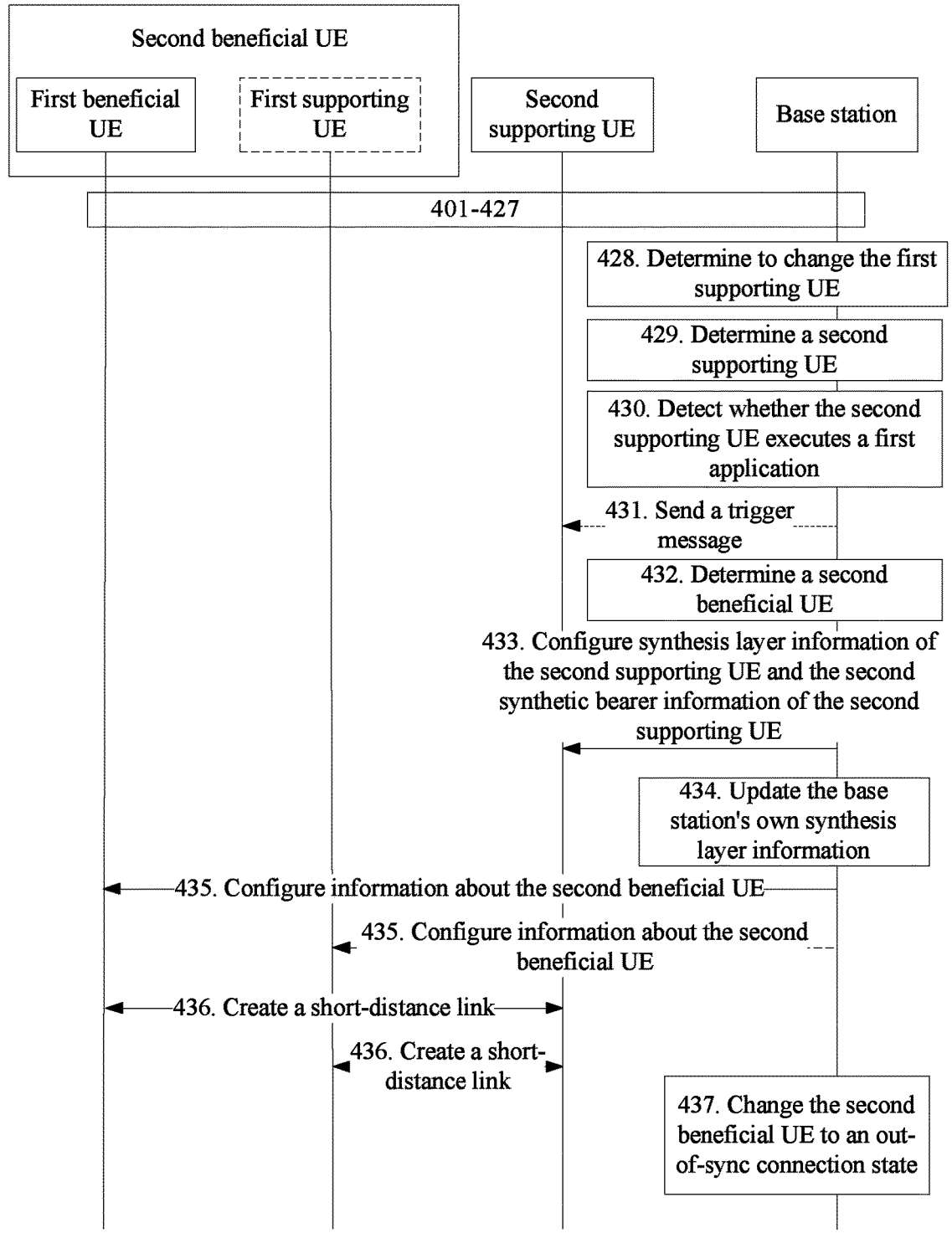
FIG. 7 is a schematic diagram of another radio link establishment method according to an embodiment of the present invention.

It should be noted that, if the base station needs to change the first supporting UE, steps 428 to 437 are performed, as shown in FIG. 7.

428. If it is determined that the first supporting UE needs to be changed, the base station initiates a procedure of changing the first supporting UE.

Specifically, the base station may detect a macro network link of the first supporting UE, and determine to change the first supporting UE if the quality index of the macro network link is detected as lower than a first preset value.

The macro network link is a communication link between the first supporting UE and the base station.

It should be noted that the first preset value is preset by the base station.

The base station may receive a short-distance link quality report sent by the first beneficial UE, and determine to change the first supporting UE if the short-distance link quality report records that the quality index of the short-distance link is lower than a second preset value.

The base station may receive a short-distance link quality report sent by the first supporting UE, and determine to change the first supporting UE if the short-distance link quality report records that the quality index of the short-distance link is lower than a third preset value.

It should be noted that the base station may also determine to change the first supporting UE according to other conditions, which is not limited in the present invention.

429. The base station determines a second supporting UE.

Specifically, the base station may select one UE other than the first supporting UE as the second supporting UE among the UEs already in the connected state or the UEs requesting to get into the connected state. The base station selects the second supporting UE in the same way as selecting the first supporting UE, and reference may be made to step 101, and no repeated description is given here any further.

Optionally, the base station may allocate a support identifier to the selected second supporting UE.

It should be noted that the support identifier of the second supporting UE may also be preset, which is not limited in the present invention.

430. The base station detects whether the second supporting UE executes a first application.

Specifically, after determining the second supporting UE, the base station detects the second supporting UE, and checks whether the second supporting UE has executed the first application. If the second supporting UE has executed the first application, step 432 is performed; and, if the second supporting UE does not execute the first application, step 431 is performed.

431. The base station sends a trigger message to the second supporting UE, and the second supporting UE receives and executes the trigger message.

Specifically, reference may be made to step 403, and no repeated description is given here any further.

432. The base station determines a second beneficial UE served by the second supporting UE.

The second beneficial UE served by the second supporting UE includes at least one of the first supporting UE and the first beneficial UE.

Further, the second beneficial UE may include the beneficial UE that is not served previously by the first supporting UE.

Specifically, after determining the second supporting UE, the base station determines the first supporting UE as the second beneficial UE served by the second supporting UE if the second supporting UE supports the service of the first supporting UE. The base station determines the first beneficial UE as the second beneficial UE served by the second supporting UE if the second supporting UE supports the service of the first beneficial UE.

If the second beneficial UE further includes the beneficial UE that is not served previously by the first supporting UE, the base station may determine the beneficial UE that is not served previously by the first supporting UE in the second beneficial UE in the same way as determining the first beneficial UE served by the first supporting UE. Reference may be made to step 406, and no repeated description is given here any further.

433. The base station configures the synthesis layer information of the second supporting UE and the second synthetic bearer information of the second supporting UE for the second supporting UE according to the radio bearer information of the second beneficial UE. The second supporting UE receives the synthesis layer information of the second supporting UE and the second synthetic bearer information of the second supporting UE.

The base station configures the synthesis layer information of the second supporting UE and the second synthetic bearer information of the second supporting UE for the second supporting UE, whereupon the second supporting UE establishes a second synthetic bearer according to the second synthetic bearer information of the second supporting UE, and establishes a short-distance link to the second beneficial UE according to the synthesis layer information of the second supporting UE.

The synthesis layer information of the second supporting UE includes a mapping relationship between a bearer identifier and the second synthetic bearer, where the mapping relationship is configured by the base station for the second supporting UE.

The second synthetic bearer information is information about a radio bearer that needs to be establishd by the second supporting UE, where the radio bearer is the same as the radio bearer of the second beneficial UE.

Optionally, the bearer identifier includes a short-distance bearer.

Specifically, the base station configures the synthesis layer information of the second supporting UE and the second synthetic bearer information of the second supporting UE for the second supporting UE in the same way as configuring the synthesis layer information of the first supporting UE and the first synthetic bearer information of the first supporting UE for the first supporting UE. Reference may be made to step 103, and no repeated description is given here any further.

The second supporting UE receives the synthesis layer information of the second supporting UE and the second synthetic bearer information of the second supporting UE. Reference may be made to step 201, and no repeated description is given here any further.

434. The base station updates synthesis layer information of the base station according to the radio bearer information of the second beneficial UE.

Specifically, when configuring the second synthetic bearer information of the second supporting UE and the synthesis layer information of the second supporting UE according to the radio bearer information of the second beneficial UE, the base station updates its own synthesis layer information from the mapping relationship between the first synthetic bearer of the first supporting UE and the radio bearer of the first beneficial UE to the mapping relationship between the second synthetic bearer of the second supporting UE and the radio bearer of the second beneficial UE, where the first synthetic bearer is marked by a bearer identifier and the second synthetic bearer is marked by a bearer identifier.

435. The base station configures information about the second beneficial UE according to the radio bearer information of the second beneficial UE.

Specifically, if the second beneficial UE includes the first beneficial UE, the base station configures short-distance link adjustment information of the first beneficial UE for the first beneficial UE according to the radio bearer information of the second beneficial UE, whereupon the first beneficial UE adjusts the supporting UE of the short-distance link to the second supporting UE according to the short-distance link adjustment information of the first beneficial UE.

The short-distance link adjustment information of the first beneficial UE includes information configured for the first beneficial UE and intended for instructing the first beneficial UE to adjust the short-distance link connected with the first supporting UE to the short-distance link connected with the second supporting UE.

Further, the base station configures synthesis layer reconfiguration information of the first beneficial UE for the first beneficial UE according to the radio bearer information of the second beneficial UE, whereupon the first beneficial UE updates the synthesis layer information of the first beneficial UE according to the synthesis layer reconfiguration information of the first beneficial UE.

Specifically, if the base station resets the bearer identifier when configuring the synthesis layer information of the second supporting UE after determining the second supporting UE, the base station sends the synthesis layer reconfiguration information of the first beneficial UE to the first beneficial UE. After receiving the synthesis layer reconfiguration information of the first beneficial UE, the first beneficial UE updates the mapping relationship between the bearer identifier and the radio bearer of the first beneficial UE.

If the second beneficial UE includes the first supporting UE, configuring synthesis layer reconfiguration information of the first supporting UE for the first supporting UE according to the radio bearer information of the second beneficial UE, whereupon the first supporting UE deletes the first synthetic bearer and establishes a short-distance link to the second supporting UE according to the synthesis layer reconfiguration information of the first supporting UE.

The synthesis layer reconfiguration information of the first supporting UE includes a mapping relationship between the bearer identifier and the radio bearer of the first supporting UE, where the mapping relationship is configured by the base station for the first supporting UE.

436. The second supporting UE establishes a short-distance link to the second beneficial UE.

Specifically, if the second beneficial UE includes the first beneficial UE, the supporting UE of the short-distance link is adjusted to the second supporting UE according to the short-distance link adjustment information of the first beneficial UE after the first beneficial UE receives the short-distance link adjustment information of the first beneficial UE.

If the second beneficial UE includes the first supporting UE, after the first supporting UE receives the synthesis layer reconfiguration information of the first supporting UE, the first supporting UE establishes a short-distance link to the second supporting UE according to the synthesis layer reconfiguration information of the first supporting UE in the same way as establishment the short-distance link between the first beneficial UE and the first supporting UE. Reference may be made to step 411, and no repeated description is given here any further.

437. The base station changes the second beneficial UE to an out-of-sync connection state.

Specifically, the base station changes the second beneficial UE from the synchronous connection state to the out-of-sync connection state in the same way as changing the first UE from the synchronous connection state to the out-of-sync connection state. Reference may be made to step 410, and no repeated description is given here any further.

In the radio link establishment method provided in the embodiment of the present invention, the base station determines the first supporting UE, and determines the first beneficial UE of the first supporting UE, and then, according to the radio bearer of the first beneficial UE, configures the synthesis layer information of the first supporting UE and the first synthetic bearer information of the first supporting UE and configures the synthesis layer information of the first beneficial UE for the first beneficial UE. In this way, the first supporting UE can establish the first synthetic bearer according to the first synthetic bearer information of the first supporting UE. The first supporting UE establishes, according to the synthesis layer information of the first supporting UE, and the first beneficial UE establishes, according to the synthesis layer information of the first beneficial UE, a short-distance link between the first supporting UE and the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into the synchronous connection state, thereby saving radio link overhead and improving system efficiency. When determining to change the first supporting UE, the base station changes the first supporting UE to the second supporting UE, and therefore, in the case that the second beneficial UE served by the second supporting UE is in an out-of-sync connection state, data can be sent to the base station through the second supporting UE, and the base station can send data to the second beneficial UE through the second supporting UE, without the need of changing to the synchronous connection state, which further saves radio link overhead and improves system efficiency.

Figure 8:
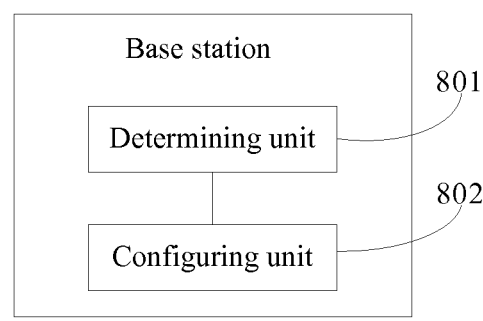
FIG. 8 is a schematic structural diagram of a base station according to an embodiment of the present invention.

An embodiment of the present invention provides a base station. As shown in FIG. 8, the base station includes:

a determining unit 801, adapted to determine a first supporting user equipment UE, where the determining unit 801 is further adapted to determine a first beneficial UE served by the first supporting UE; and a configuring unit 802, adapted to configure synthesis layer information of the first supporting UE and first synthetic bearer information of the first supporting UE for the first supporting UE according to radio bearer information of the first beneficial UE, whereupon the first supporting UE establishes a first synthetic bearer according to the first synthetic bearer information of the first supporting UE and establishes a short-distance link to the first beneficial UE according to the synthesis layer information of the first supporting UE, so that the first supporting UE receives uplink data sent by the first beneficial UE over the short-distance link and sends the uplink data to a base station over the first synthetic bearer, or, receives downlink data sent by the base station over the first synthetic bearer and sends the downlink data to the first beneficial UE over the short-distance link, where the synthesis layer information of the first supporting UE includes a mapping relationship between a bearer identifier and a first synthetic bearer, where the mapping relationship is configured by the base station for the first supporting UE.

The first synthetic bearer information is information about a radio bearer that needs to be establishd by the first supporting UE, where the radio bearer is the same as the radio bearer of the first beneficial UE.

Optionally, the bearer identifier includes a short-distance bearer.

The bearer identifier is configured by the base station, and marks the one-to-one mapping relationship between the radio bearer of the beneficial UE and the synthetic bearer of the supporting UE.

It should be noted that the first synthetic bearer is establishd by the first supporting UE, and is a radio bearer for transmitting the data of the first beneficial UE.

The configuring unit 802 is further adapted to configure synthesis layer information of the first beneficial UE for the first beneficial UE according to the radio bearer information of the first beneficial UE, whereupon the first beneficial UE establishes a short-distance link to the first supporting UE according to the synthesis layer information of the first beneficial UE, so that the first beneficial UE sends the uplink data to the first supporting UE over the short-distance link or receives downlink data sent by the first supporting UE over the short-distance link.

The synthesis layer information of the first beneficial UE includes a mapping relationship between the bearer identifier and a radio bearer of the first beneficial UE, where the mapping relationship is configured by the base station for the first beneficial UE.

The configuring unit 802 is further adapted to configure synthesis layer information of the base station according to the radio bearer information of the first beneficial UE.

Synthesis layer information of the base station includes a mapping relationship between the first synthetic bearer identified by the bearer identifier and the radio bearer.

Figure 9:
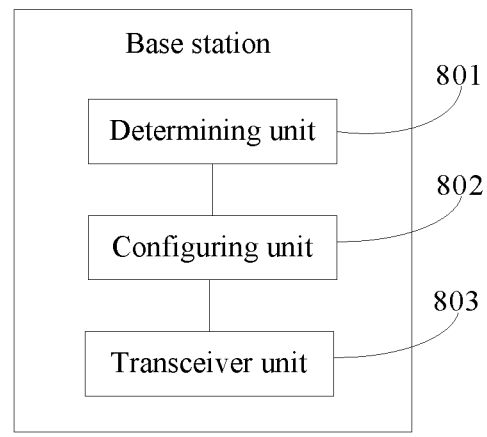
FIG. 9 is a schematic structural diagram of another base station according to an embodiment of the present invention.

As shown in FIG. 9, the base station further includes:

a transceiver unit 803, adapted to receive a radio resource control RRC protocol connection establishment request message sent by the first UE.

The RRC connection establishment request message carries at least one support identifier.

The determining unit 801 is specifically adapted to: if the at least one support identifier includes a support identifier of the first supporting UE, determine that the first UE is the first beneficial UE served by the first supporting UE.

Further, the transceiver unit 803 is further adapted to: if the first supporting UE does not execute the first application, send a trigger message to the first supporting UE.

The trigger message is a message for instructing the supporting UE selected by the base station to execute a first application. The first application is an application run by the supporting UE.

Figure 10:
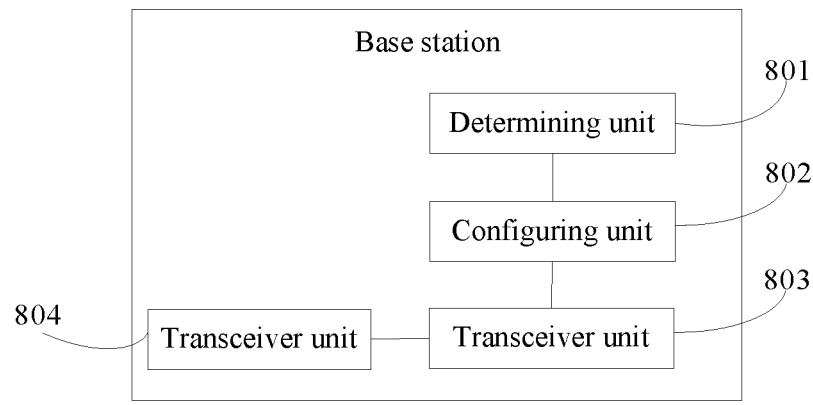
FIG. 10 is a schematic structural diagram of another base station according to an embodiment of the present invention.

As shown in FIG. 10, the base station further includes:

a processing unit 804, adapted to send no time alignment TA information to the first beneficial UE within a preset time so that the first beneficial UE changes into an out-of-sync connection state.

The transceiver unit 803 is further adapted to receive the uplink data sent by the first supporting UE.

The uplink data carries a first bearer identifier.

The determining unit 801 is specifically adapted to: according to the first bearer identifier in the uplink data and synthesis layer information of the base station, determine a radio bearer of the first beneficial UE that sends the uplink data, where the radio bearer corresponds to the first bearer identifier.

Further, the transceiver unit 803 is further adapted to send the downlink data to the first supporting UE.

The downlink data carries a second bearer identifier, and therefore, the first supporting UE determines a first synthetic bearer corresponding to the second bearer identifier according to the second bearer identifier and uses the first synthetic bearer corresponding to the second bearer identifier to receive the downlink data, so that the first supporting UE sends the downlink data to a corresponding first beneficial UE over a short-distance link corresponding to the first synthetic bearer corresponding to the second bearer identifier.

Further, the processing unit 804 is further adapted to: if it is determined that the first supporting UE needs to be changed, initiate a procedure of changing the first supporting UE.

Specifically, the processing unit 804 is specifically adapted to: detect a macro network link of the first supporting UE, where the macro network link is a communication link between the first supporting UE and the base station, and determine to change the first supporting UE if a quality index of the macro network link is detected as lower than a first preset value; or, receive a short-distance link quality report sent by the first beneficial UE, and determine to change the first supporting UE if the short-distance link quality report records that a quality index of the short-distance link is lower than a second preset value; or, receive a short-distance link quality report sent by the first supporting UE, and determine to change the first supporting UE if the short-distance link quality report records that a quality index of the short-distance link is lower than a third preset value.

It should be noted that the first preset value, the second preset value, and the third preset value are preset.

Further, the processing unit 804 is specifically adapted to trigger the determining unit 801 to determine a second supporting UE.

The determining unit 801 is further adapted to determine the second supporting UE.

The determining unit 801 is further adapted to determine a second beneficial UE served by the second supporting UE.

The second beneficial UE includes at least one of the first supporting UE and the first beneficial UE.

The configuring unit 802 is further adapted to configure synthesis layer information of the second supporting UE and second synthetic bearer information of the second supporting UE for the second supporting UE according to radio bearer information of the second beneficial UE, whereupon the second supporting UE establishes a second synthetic bearer according to the second synthetic bearer information of the second supporting UE, and establishes a short-distance link to the second beneficial UE according to the synthesis layer information of the second supporting UE.

The synthesis layer information of the second supporting UE includes a mapping relationship between a bearer identifier and the second synthetic bearer, where the mapping relationship is configured by the base station for the second supporting UE.

The second synthetic bearer information is information about a radio bearer that needs to be establishd by the second supporting UE, where the radio bearer is the same as the radio bearer of the second beneficial UE.

Optionally, the bearer identifier includes a short-distance bearer.

The configuring unit 802 is further adapted to update synthesis layer information of the base station according to the radio bearer information of the second beneficial UE.

The configuring unit 802 is further adapted to: if the second beneficial UE includes the first beneficial UE, configure short-distance link adjustment information of the first beneficial UE for the first beneficial UE according to the radio bearer information of the second beneficial UE, whereupon the first beneficial UE adjusts the supporting UE of the short-distance link to the second supporting UE according to the short-distance link adjustment information of the first beneficial UE.

Further, the configuring unit further configures synthesis layer reconfiguration information of the first beneficial UE for the first beneficial UE according to the radio bearer information of the second beneficial UE, whereupon the first beneficial UE updates the synthesis layer information of the first beneficial UE according to the synthesis layer reconfiguration information of the first beneficial UE.

The short-distance link adjustment information of the first beneficial UE includes information configured for the first beneficial UE and intended for instructing the first beneficial UE to adjust the short-distance link connected with the first supporting UE to the short-distance link connected with the second supporting UE.

If the second beneficial UE includes the first supporting UE, configure synthesis layer reconfiguration information of the first supporting UE for the first supporting UE according to the radio bearer information of the second beneficial UE, whereupon the first supporting UE deletes the first synthetic bearer and establishes a short-distance link to the second supporting UE according to the synthesis layer reconfiguration information of the first supporting UE.

The synthesis layer reconfiguration information of the first supporting UE includes a mapping relationship between the bearer identifier and the radio bearer of the first supporting UE, where the mapping relationship is configured by the base station for the first supporting UE.

The transceiver unit 803 is further adapted to: if the second supporting UE does not execute the first application, send a trigger message to the second supporting UE.

In the base station provided in the embodiment of the present invention, the base station determines the first supporting UE, and determines the first beneficial UE of the first supporting UE, and then, according to the radio bearer of the first beneficial UE, configures the synthesis layer information of the first supporting UE and the first synthetic bearer information of the first supporting UE and configures the synthesis layer information of the first beneficial UE for the first beneficial UE. In this way, the first supporting UE can establish the first synthetic bearer according to the first synthetic bearer information of the first supporting UE. The first supporting UE establishes, according to the synthesis layer information of the first supporting UE, and the first beneficial UE establishes, according to the synthesis layer information of the first beneficial UE, a short-distance link between the first supporting UE and the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency.

Figure 11:
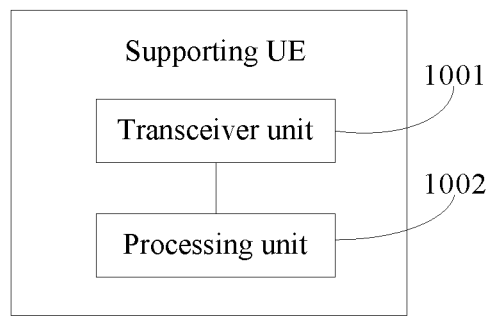
FIG. 11 is a schematic structural diagram of a supporting UE according to an embodiment of the present invention.

An embodiment of the present invention provides a supporting user equipment UE. As shown in FIG. 11, the supporting UE includes:

a transceiver unit 1001, adapted to receive synthesis layer information of a first supporting UE and first synthetic bearer information of the first supporting UE that are sent by a base station, where the synthesis layer information of the first supporting UE includes a mapping relationship between a bearer identifier and a first synthetic bearer, where the mapping relationship is configured by the base station for the first supporting UE; and a processing unit 1002, adapted to establish a short-distance link to a first beneficial UE according to the synthesis layer information of the first supporting UE, and establish a first synthetic bearer according to the first synthetic bearer information of the first supporting UE.

The transceiver unit 1001 is further adapted to receive a trigger message sent by the base station.

The trigger message is a message for instructing the supporting UE selected by the base station to execute a first application. The first application is an application run by the supporting UE.

The transceiver unit 1001 is further adapted to receive the uplink data sent by the first beneficial UE over the short-distance link.

The uplink data carries a first bearer identifier.

The processing unit 1002 is further adapted to determine a first synthetic bearer corresponding to the first bearer identifier according to the first bearer identifier and the synthesis layer information of the first supporting UE.

The transceiver unit 1001 is further adapted to send the uplink data to the base station over the first synthetic bearer corresponding to the first bearer identifier.

The transceiver unit 1001 is further adapted to receive downlink data sent by the base station.

The downlink data carries a second bearer identifier.

The processing unit 1002 is further adapted to determine a first synthetic bearer corresponding to the second bearer identifier according to the second bearer identifier and the synthesis layer information of the first supporting UE.

The transceiver unit 1001 is further adapted to send the downlink data to a corresponding first beneficial UE over the first synthetic bearer corresponding to the second bearer identifier and a short-distance link corresponding to the first synthetic bearer corresponding to the second bearer identifier.

The processing unit 1002 is further adapted to detect the short-distance link.

The transceiver unit 1001 is further adapted to send a short-distance link quality report to the base station if it is detected that a quality index of the short-distance link is lower than a third preset value.

The transceiver unit 1001 is further adapted to receive synthesis layer reconfiguration information of the first supporting UE that is sent by the base station.

The synthesis layer reconfiguration information of the first supporting UE includes a mapping relationship between the bearer identifier and the radio bearer of the first supporting UE, where the mapping relationship is configured by the base station for the first supporting UE.

The processing unit 1002 is further adapted to delete the first synthetic bearer.

The processing unit 1002 is further adapted to establish a short-distance link to a second supporting UE according to the synthesis layer reconfiguration information of the first supporting UE.

In the supporting UE provided in the embodiment of the present invention, after receiving the synthesis layer information of the first supporting UE and the first synthetic bearer information of the first supporting UE that are sent by the base station, the base station establishes a short-distance link to the first beneficial UE according to the synthesis layer information of the first supporting UE, and establishes a first synthetic bearer according to the first synthetic bearer information of the first supporting UE, so that the data information of the first beneficial UE is forwarded. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency.

Figure 12:
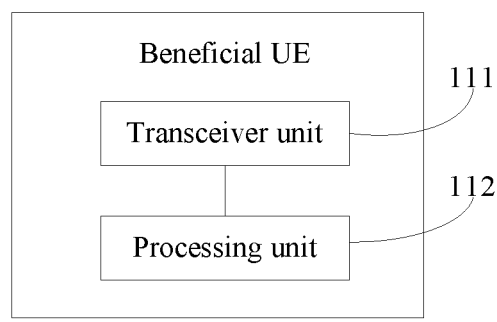
FIG. 12 is a schematic structural diagram of a beneficial UE according to an embodiment of the present invention.

An embodiment of the present invention provides a benefited user equipment UE. As shown in FIG. 12, the supporting UE includes:

a transceiver unit 111, adapted to receive synthesis layer information of a first beneficial UE that is sent by a base station; where the synthesis layer information of the first beneficial UE includes a mapping relationship between the bearer identifier and a radio bearer of the first beneficial UE, where the mapping relationship is configured by the base station for the first beneficial UE; and a processing unit 112, adapted to establish a short-distance link to a first supporting UE according to the synthesis layer information of the first beneficial UE.

The processing unit 112 is further adapted to obtain at least one support identifier.

The transceiver unit 111 is further adapted to send a radio resource control RRC protocol connection establishment request message to the base station.

The RRC connection establishment request message carries at least one support identifier of the supporting UE.

The processing unit 112 is further adapted to: according to the synthesis layer information of the first beneficial UE, determine a first bearer identifier corresponding to a radio bearer that needs to send uplink data.

The processing unit 112 is further adapted to add the first bearer identifier into the uplink data.

The transceiver unit 111 is further adapted to send the uplink data to the first supporting UE over the radio bearer and the short-distance link corresponding to the radio bearer.

The processing unit 112 is further adapted to receive the downlink data sent by the first supporting UE over the short-distance link.

The downlink data carries a second bearer identifier.

The processing unit 112 is further adapted to determine a radio bearer corresponding to the second bearer identifier according to the second bearer identifier and the synthesis layer information of the first beneficial UE.

The transceiver unit 111 is further adapted to receive the downlink data over the radio bearer corresponding to the second bearer identifier.

The processing unit 112 is further adapted to detect the short-distance link.

The processing unit 112 is further adapted to: if it is detected that a quality index of the short-distance link is lower than a second preset value, change from an out-of-sync connection state to a synchronous connection state.

The transceiver unit 111 is further adapted to send a short-distance link quality report to the base station.

The transceiver unit 111 is further adapted to receive short-distance link adjustment information of the first beneficial UE that is sent by the base station.

The short-distance link adjustment information of the first beneficial UE includes information configured for the first beneficial UE and intended for instructing the first beneficial UE to adjust the short-distance link connected with the first supporting UE to the short-distance link connected with the second supporting UE.

The processing unit 112 is further adapted to adjust the supporting UE of the short-distance link from the first supporting UE to a second supporting UE according to the short-distance link adjustment information of the first beneficial UE.

The transceiver unit 111 is further adapted to receive synthesis layer reconfiguration information of the first beneficial UE from the base station.

The processing unit 112 is further adapted to update the synthesis layer information of the first beneficial UE according to the synthesis layer reconfiguration information of the first beneficial UE.

In the beneficial UE provided in the embodiment of the present invention, the first beneficial UE receives the synthesis layer information of the first beneficial UE that is sent by the base station, and establishes a short-distance link to the first supporting UE according to the synthesis layer information of the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into the synchronous connection state, thereby saving radio link overhead and improving system efficiency.

Figure 13:
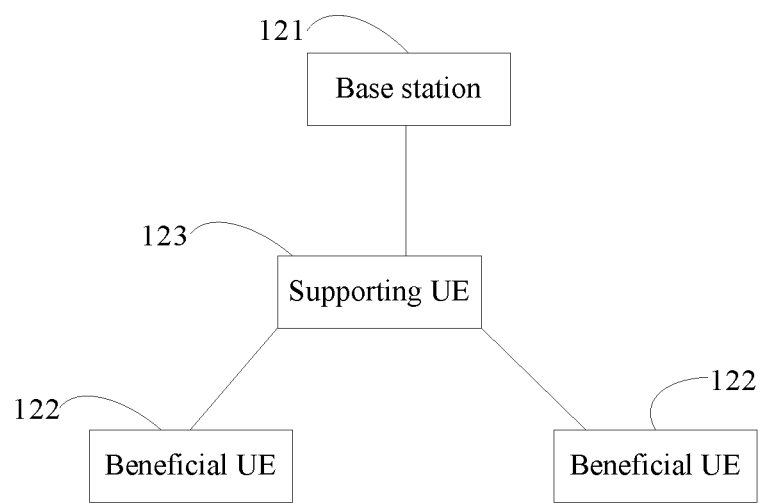
FIG. 13 is a schematic diagram of a radio link establishment system according to an embodiment of the present invention.

As shown in FIG. 13, a radio link establishment system includes a base station 121, a benefited user equipment UE 122, and a supporting UE 123.

The base station 121 is the base station 121 described in the preceding embodiment; the supporting UE is the supporting UE 122 described in the preceding embodiment; and the beneficial UE is the beneficial UE 123 described in the preceding embodiment.

In the radio link establishment method, apparatus, and system provided in the embodiments of the present invention, the base station determines the first supporting UE, and determines the first beneficial UE of the first supporting UE, and then, according to the radio bearer of the first beneficial UE, configures the synthesis layer information of the first supporting UE and the first synthetic bearer information of the first supporting UE and configures the synthesis layer information of the first beneficial UE for the first beneficial UE. In this way, the first supporting UE can establish the first synthetic bearer according to the first synthetic bearer information of the first supporting UE. The first supporting UE establishes, according to the synthesis layer information of the first supporting UE, and the first beneficial UE establishes, according to the synthesis layer information of the first beneficial UE, a short-distance link between the first supporting UE and the first beneficial UE. In this way, if the first beneficial UE is in an out-of-sync connection state, the first supporting UE may send data to the base station, and the base station sends the data to the first beneficial UE by using the first supporting UE, without requiring the first beneficial UE to change into a synchronous connection state, thereby saving radio link overhead and improving system efficiency. When determining to change the first supporting UE, the base station changes the first supporting UE to the second supporting UE, and therefore, in the case that the second beneficial UE served by the second supporting UE is in an out-of-sync connection state, data can be sent to the base station through the second supporting UE, and the base station can send data to the second beneficial UE through the second supporting UE, without the need of changing to the synchronous connection state, which further saves radio link overhead and improves system efficiency.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A radio link establishment method, comprising:
   determining a first supporting user equipment UE;
   determining a first beneficial UE served by the first supporting UE;
   configuring synthesis layer information of the first supporting UE and first synthetic bearer information of the first supporting UE for the first supporting UE according to radio bearer information of the first beneficial UE, so that the first supporting UE establishes a first synthetic bearer according to the first synthetic bearer information of the first supporting UE and establishes a short-distance link to the first beneficial UE according to the synthesis layer information of the first supporting UE, and the first supporting UE receives uplink data sent by the first beneficial UE over the short-distance link and sends the uplink data to a base station over the first synthetic bearer, or, receives downlink data sent by the base station over the first synthetic bearer and sends the downlink data to the first beneficial UE over the short-distance link;
   configuring synthesis layer information of the first beneficial UE for the first beneficial UE according to the radio bearer information of the first beneficial UE, whereupon the first beneficial UE establishes a short-distance link to the first supporting UE according to the synthesis layer information of the first beneficial UE, so that the first beneficial UE sends the uplink data to the first supporting UE over the short-distance link or receives downlink data sent by the first supporting UE over the short-distance link; and
   configuring synthesis layer information of the base station according to the radio bearer information of the first beneficial UE,
   such that when the first beneficial UE is in an out-of-sync connection state, the first supporting UE sends data to the base station, and the base station sends the data to the first beneficial UE by using the first supporting UE, without requiring the first beneficial UE to change into a synchronous connection state.

2. The method according to claim 1, wherein:
   the synthesis layer information of the first supporting UE comprises a mapping relationship between a bearer identifier and the first synthetic bearer, wherein the mapping relationship is configured by the base station for the first supporting UE;
   the synthesis layer information of the first beneficial UE comprises a mapping relationship between the bearer identifier and a radio bearer of the first beneficial UE, wherein the mapping relationship is configured by the base station for the first beneficial UE; and
   synthesis layer information of the base station comprises a mapping relationship between the first synthetic bearer identified by the bearer identifier and the radio bearer.

3. The method according to claim 1, wherein: before the determining a first beneficial UE served by the first supporting UE, the method further comprises:
   receiving a radio resource control RRC establishment request message sent by a first UE, wherein the RRC establishment request message carries at least one support identifier; and
   the determining a first beneficial UE served by the first supporting UE comprises:

if the at least one support identifier comprises a support identifier of the first supporting UE, determining that the first UE is the first beneficial UE served by the first supporting UE.

4. The method according to claim 1, wherein the method further comprises:
receiving uplink data sent by the first supporting UE, wherein the uplink data carries a first bearer identifier; and
according to the first bearer identifier carried in the uplink data and synthesis layer information of the base station, determining a radio bearer of the first beneficial UE that sends the uplink data, wherein the radio bearer corresponds to the first bearer identifier.

5. The method according to claim 1, wherein the method further comprises:
if it is determined that the first supporting UE needs to be changed, initiating a procedure of changing the first supporting UE.

6. The method according to claim 5, wherein the determining that the first supporting UE needs to be changed comprises:
detecting a macro network link of the first supporting UE, wherein the macro network link is a communication link between the first supporting UE and the base station, and determining to change the first supporting UE if a quality index of the macro network link is detected as lower than a first preset value; or
receiving a short-distance link quality report sent by the first beneficial UE, and determining to change the first supporting UE if the short-distance link quality report records that a quality index of the short-distance link is lower than a second preset value; or
receiving a short-distance link quality report sent by the first supporting UE, and determining to change the first supporting UE if the short-distance link quality report records that a quality index of the short-distance link is lower than a third preset value.

7. The method according to claim 5, wherein the initiating a procedure of changing the first supporting UE comprises:
determining a second supporting UE;
determining a second beneficial UE served by the second supporting UE, wherein the second beneficial UE comprises at least one of the first supporting UE and the first beneficial UE;
configuring synthesis layer information of the second supporting UE and second synthetic bearer information of the second supporting UE for the second supporting UE according to radio bearer information of the second beneficial UE, whereupon the second supporting UE establishes a second synthetic bearer according to the second synthetic bearer information of the second supporting UE, and establishes a short-distance link to the second beneficial UE according to the synthesis layer information of the second supporting UE;
updating synthesis layer information of the base station according to the radio bearer information of the second beneficial UE;
if the second beneficial UE comprises the first beneficial UE, configuring short-distance link adjustment information of the first beneficial UE for the first beneficial UE according to the radio bearer information of the second beneficial UE, whereupon the first beneficial UE adjusts the supporting UE of the short-distance link to the second supporting UE according to the short-distance link adjustment information of the first beneficial UE; and if the second beneficial UE comprises the first supporting UE, configuring synthesis layer reconfiguration information of the first supporting UE for the first supporting UE according to the radio bearer information of the second beneficial UE, whereupon the first supporting UE deletes the first synthetic bearer and establishes a short-distance link to the second supporting UE according to the synthesis layer reconfiguration information of the first supporting UE.

8. A radio link establishment method, comprising:
receiving, by a first supporting user equipment UE, synthesis layer information of the first supporting user equipment UE and first synthetic bearer information of the first supporting UE that are sent by a base station, wherein the synthesis layer information of the first supporting UE comprises a mapping relationship between a bearer identifier and a first synthetic bearer, wherein the mapping relationship is configured by the base station for the first supporting UE; and
establishing, by the first supporting UE, a short-distance link between the first supporting UE and a first beneficial UE according to the synthesis layer information of the first supporting UE, and
establishing a first synthetic bearer between the first supporting UE and the base station according to the first synthetic bearer information of the first supporting UE,
such that when the first beneficial UE is in an out-of-sync connection state, the first supporting UE sends data to the base station, and the base station sends the data to the first beneficial UE by using the first supporting UE, without requiring the first beneficial UE to change into a synchronous connection state.

9. The method according to claim 8, wherein the method further comprises:
receiving uplink data sent by the first beneficial UE over the short-distance link, wherein the uplink data carries a first bearer identifier;
determining a first synthetic bearer corresponding to the first bearer identifier according to the first bearer identifier and the synthesis layer information of the first supporting UE; and
sending the uplink data to the base station over the first synthetic bearer corresponding to the first bearer identifier.

10. The method according to claim 8, wherein the method further comprises:
receiving downlink data sent by the base station, wherein the downlink data carries a second bearer identifier;
determining a first synthetic bearer corresponding to the second bearer identifier according to the second bearer identifier and the synthesis layer information of the first supporting UE; and
sending the downlink data to a corresponding first beneficial UE over the first synthetic bearer corresponding to the second bearer identifier and a short-distance link corresponding to the first synthetic bearer corresponding to the second bearer identifier.

11. The method according to claim 8, further comprising:
detecting the short-distance link; and
sending a short-distance link quality report to the base station if it is detected that a quality index of the short-distance link is lower than a third preset value.

12. The method according to claim 8, wherein the method further comprises:
receiving synthesis layer reconfiguration information of the first supporting UE that is sent by the base station;

deleting the first synthetic bearer; and
establishment a short-distance link to a second supporting UE according to the synthesis layer reconfiguration information of the first supporting UE.

13. A base station, comprising:
at least one memory configured to store instructions; and
at least one processor configured to execute the stored instructions, the at least one processor configured to:
determine a first supporting user equipment UE, wherein the at least one processor is further adapted to determine a first beneficial UE served by the first supporting UE; and
configure synthesis layer information of the first supporting UE and first synthetic bearer information of the first supporting UE for the first supporting UE according to radio bearer information of the first beneficial UE, whereupon the first supporting UE establishes a first synthetic bearer according to the first synthetic bearer information of the first supporting UE and establishes a short-distance link to the first beneficial UE according to the synthesis layer information of the first supporting UE, so that the first supporting UE receives uplink data sent by the first beneficial UE over the short-distance link and sends the uplink data to a base station over the first synthetic bearer, or, receives downlink data sent by the base station over the first synthetic bearer and sends the downlink data to the first beneficial UE over the short-distance link, wherein
the at least one processor is further adapted to configure synthesis layer information of the first beneficial UE for the first beneficial UE according to the radio bearer information of the first beneficial UE, whereupon the first beneficial UE establishes a short-distance link to the first supporting UE according to the synthesis layer information of the first beneficial UE, so that the first beneficial UE sends the uplink data to the first supporting UE over the short-distance link or receives downlink data sent by the first supporting UE over the short-distance link; and
the at least one processor is further adapted to configure synthesis layer information of the base station according to the radio bearer information of the first beneficial UE,
such that when the first beneficial UE is in an out-of-sync connection state, the first supporting UE sends data to the base station, and the base station sends the data to the first beneficial UE by using the first supporting UE, without requiring the first beneficial UE to change into a synchronous connection state.

14. The base station according to claim 13, wherein:
the synthesis layer information of the first supporting UE comprises a mapping relationship between a bearer identifier and the first synthetic bearer, wherein the mapping relationship is configured by the base station for the first supporting UE;
the synthesis layer information of the first beneficial UE comprises a mapping relationship between the bearer identifier and a radio bearer of the first beneficial UE, wherein the mapping relationship is configured by the base station for the first beneficial UE; and
synthesis layer information of the base station comprises a mapping relationship between the first synthetic bearer identified by the bearer identifier and the radio bearer.

15. The base station according to claim 13, wherein the at least one processor is further configured to:

receive a radio resource control protocol connection RRC establishment request message sent by a first UE, wherein the RRC establishment request message carries at least one support identifier, wherein
the at least one processor is specifically adapted to: if the at least one support identifier comprises a support identifier of the first supporting UE, determine that the first UE is the first beneficial UE served by the first supporting UE.

16. The base station according to claim 15, wherein:
the at least one processor is further adapted to receive uplink data sent by the first supporting UE, wherein the uplink data carries a first bearer identifier; and
the at least one processor is specifically adapted to: according to the first bearer identifier in the uplink data and synthesis layer information of the base station, determine a radio bearer of the first beneficial UE that sends the uplink data, wherein the radio bearer corresponds to the first bearer identifier.

17. The base station according to claim 15, wherein:
the at least one processor is further adapted to send downlink data that carries a second bearer identifier to the first supporting UE, whereupon the first supporting UE determines a first synthetic bearer corresponding to the second bearer identifier according to the second bearer identifier and uses the first synthetic bearer corresponding to the second bearer identifier to receive the downlink data, so that the first supporting UE sends the downlink data to a corresponding first beneficial UE over a short-distance link corresponding to the first synthetic bearer corresponding to the second bearer identifier.

18. The base station according to claim 13, wherein the at least one processor is further configured to:
send no time alignment TA information to the first beneficial UE within a preset time so that the first beneficial UE changes into the out-of-sync connection state.

19. The base station according to claim 18, wherein:
the at least one processor is further adapted to: if it is determined that the first supporting UE needs to be changed, initiate a procedure of changing the first supporting UE.

20. The base station according to claim 19, wherein:
the at least one processor is specifically adapted to: detect a macro network link of the first supporting UE, wherein the macro network link is a communication link between the first supporting UE and the base station, and determine to change the first supporting UE if a quality index of the macro network link is detected as lower than a first preset value; or
receive a short-distance link quality report sent by the first beneficial UE, and determine to change the first supporting UE if the short-distance link quality report records that a quality index of the short-distance link is lower than a second preset value; or
receive a short-distance link quality report sent by the first supporting UE, and determine to change the first supporting UE if the short-distance link quality report records that a quality index of the short-distance link is lower than a third preset value.

21. The base station according to claim 19, wherein:
the at least one processor is further adapted to determine a second supporting UE;
the at least one processor is further adapted to determine a second beneficial UE served by the second supporting UE, wherein the second beneficial UE comprises at least one of the first supporting UE and the first beneficial UE;

the at least one processor is further adapted to configure synthesis layer information of the second supporting UE and second synthetic bearer information of the second supporting UE for the second supporting UE according to radio bearer information of the second beneficial UE, whereupon the second supporting UE establishes a second synthetic bearer according to the second synthetic bearer information of the second supporting UE, and establishes a short-distance link to the second beneficial UE according to the synthesis layer information of the second supporting UE;

the at least one processor is further adapted to update synthesis layer information of the base station according to the radio bearer information of the second beneficial UE; and the at least one processor is further adapted to: if the second beneficial UE comprises the first beneficial UE, configure short-distance link adjustment information of the first beneficial UE for the first beneficial UE according to the radio bearer information of the second beneficial UE, whereupon the first beneficial UE adjusts the supporting UE of the short-distance link to the second supporting UE according to the short-distance link adjustment information of the first beneficial UE; and if the second beneficial UE comprises the first supporting UE, configure synthesis layer reconfiguration information of the first supporting UE for the first supporting UE according to the radio bearer information of the second beneficial UE, whereupon the first supporting UE deletes the first synthetic bearer and establishes a short-distance link to the second supporting UE according to the synthesis layer reconfiguration information of the first supporting UE.

22. A supporting user equipment UE, comprising:
at least one memory configured to store instructions; and
at least one processor configured to execute the stored instructions, the at least one processor configured to:
receive synthesis layer information of a first supporting UE and first synthetic bearer information of the first supporting UE that are sent by a base station, wherein the synthesis layer information of the first supporting UE comprises a mapping relationship between a bearer identifier and a first synthetic bearer, wherein the mapping relationship is configured by the base station for the first supporting UE; and
establish a short-distance link between the first supporting UE and a first beneficial UE according to the synthesis layer information of the first supporting UE, and establish a first synthetic bearer between the first supporting UE and the base station according to the first synthetic bearer information of the first supporting UE,
such that when the first beneficial UE is in an out-of-sync connection state, the first supporting UE sends data to the base station, and the base station sends the data to the first beneficial UE by using the first supporting UE, without requiring the first beneficial UE to change into a synchronous connection state.

23. The supporting UE according to claim 22, wherein:
the at least one processor is further adapted to receive uplink data sent by the first beneficial UE over the short-distance link, wherein the uplink data carries a first bearer identifier;

the at least one processor is further adapted to determine a first synthetic bearer corresponding to the first bearer identifier according to the first bearer identifier and the synthesis layer information of the first supporting UE; and the at least one processor is further adapted to send the uplink data to the base station over the first synthetic bearer corresponding to the first bearer identifier.

24. The supporting UE according to claim 22, wherein:
the at least one processor is further adapted to receive downlink data sent by the base station, wherein the downlink data carries a second bearer identifier;

the at least one processor is further adapted to determine a first synthetic bearer corresponding to the second bearer identifier according to the second bearer identifier and the synthesis layer information of the first supporting UE; and the at least one processor is further adapted to send the downlink data to a corresponding first beneficial UE over the first synthetic bearer corresponding to the second bearer identifier and a short-distance link corresponding to the first synthetic bearer corresponding to the second bearer identifier.

25. The supporting UE according to claim 22, wherein:
the at least one processor is further adapted to detect the short-distance link; and the at least one processor is further adapted to send a short-distance link quality report to the base station if it is detected that a quality index of the short-distance link is lower than a third preset value.

26. The supporting UE according to claim 22, wherein:
the at least one processor is further adapted to receive synthesis layer reconfiguration information of the first supporting UE that is sent by the base station;

the at least one processor is further adapted to delete the first synthetic bearer; and the at least one processor is further adapted to establish a short-distance link to a second supporting UE according to the synthesis layer reconfiguration information of the first supporting UE.

27. A benefited user equipment UE, comprising:
at least one memory configured to store instructions; and
at least one processor configured to execute the stored instructions, the at least one processor configured to:
receive synthesis layer information of a first beneficial UE that is sent by a base station, wherein the synthesis layer information of the first beneficial UE comprises a mapping relationship between a bearer identifier and a radio bearer of the first beneficial UE, wherein the mapping relationship is configured by the base station for the first beneficial UE; and
establish a short-distance link to a first supporting UE according to the synthesis layer information of the first beneficial UE,
such that when the first beneficial UE is in an out-of-sync connection state, the first supporting UE sends data to the base station, and the base station sends the data to the first beneficial UE by using the first supporting UE, without requiring the first beneficial UE to change into a synchronous connection state.

28. The beneficial UE according to claim 27, wherein:
the at least one processor is further adapted to obtain at least one support identifier; and the at least one processor is further adapted to send a radio resource control protocol connection RRC establishment request message to the base station, wherein the RRC establishment request message carries at least one support identifier of the supporting UE.

29. The beneficial UE according to claim 27, wherein:

the at least one processor is further adapted to: according to the synthesis layer information of the first beneficial UE, determine a first bearer identifier corresponding to a radio bearer that needs to send uplink data;

the at least one processor is further adapted to add the first bearer identifier into the uplink data; and the at least one processor is further adapted to send the uplink data to the first supporting UE over the radio bearer and the short-distance link corresponding to the radio bearer.

30. The beneficial UE according to claim 27, wherein:

the at least one processor is further adapted to receive downlink data sent by the first supporting UE over the short-distance link, wherein the downlink data carries a second bearer identifier;

the at least one processor is further adapted to determine a radio bearer corresponding to the second bearer identifier according to the second bearer identifier and the synthesis layer information of the first beneficial UE; and the at least one processor is further adapted to receive the downlink data over the radio bearer corresponding to the second bearer identifier.

* * * * *